United States Patent [19]

Mosberger

[11] 4,360,301
[45] Nov. 23, 1982

[54] EXPANSION PLUG FOR SECURING FASTENING ELEMENTS

[75] Inventor: Clemens Mosberger, Witterswil, Switzerland

[73] Assignee: Bernal AG, Reinach, Switzerland

[21] Appl. No.: 168,879

[22] Filed: Jul. 14, 1980

Related U.S. Application Data

[63] Continuation of Ser. No. 657,223, Feb. 11, 1976, abandoned.

[30] Foreign Application Priority Data

May 6, 1975 [DE] Fed. Rep. of Germany ....... 2520019

[51] Int. Cl.³ .............................................. F16B 13/06
[52] U.S. Cl. ......................................... 411/57; 411/73
[58] Field of Search .................. 411/57, 73, 72, 71, 411/59, 58, 60, 44

[56] References Cited

U.S. PATENT DOCUMENTS 3,516,324   6/1970   Berner .................................... 411/71

FOREIGN PATENT DOCUMENTS

| 1941148 | 2/1971 | Fed. Rep. of Germany | 411/73 |
| 2019684 | 11/1971 | Fed. Rep. of Germany | 411/73 |
| 2029407 | 12/1971 | Fed. Rep. of Germany | 411/57 |
| 2129218 | 12/1971 | Fed. Rep. of Germany | 411/72 |
| 480551 | 12/1969 | Switzerland | 411/73 |

Primary Examiner—Ramon S. Britts
Attorney, Agent, or Firm—Edwin E. Greigg

[57] ABSTRACT

An expansion sleeve for securing fastening elements, such as screws, into a wall, comprises a substantially cylindrical sleeve having an insertion end with a front portion adjacent said insertion end with an exterior surface tapering inwardly toward this end and with a plurality of outwardly extending sawtooth projections extending along the longitudinal length thereof adjacent this end. The expandable plug has a closed neck adjacent the opposite end and it includes at least one longitudinal slot and preferably one on each diametrical side extending along a substantial portion of its length from the insertion end to the solid cylindrical sleeve portion. A thickening strip extends longitudinally along preferably each diametric side on sides opposite to the slot sides and they are also provided with a series of longitudinally spaced sawtooth projections. The exterior surface of the expandable plug is provided with a recess along the base or juncture of the thickening strips to the expandable plug in order to permit the thickening strips to pivot during insertion in a direction to cause them to collapse against the side of the expandable plug body. Preferably, a web is provided to hold the front end portions together in the front end area where the slots permit separation of the end portions into two separate parts. The trailing end of the device advantageously includes wedge-shape fins which extend outwardly from the solid sleeve portion. In the preferred arrangement, the thickening strips extend substantially radially outwardly at diametrically opposite sides and they are undercut at their base by the recess formed along the length of the expandable plug adjacent the strips.

4 Claims, 6 Drawing Figures

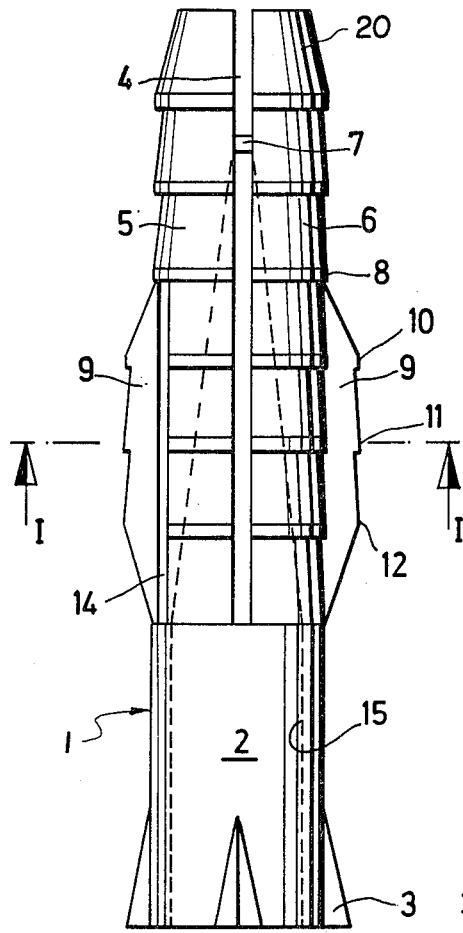
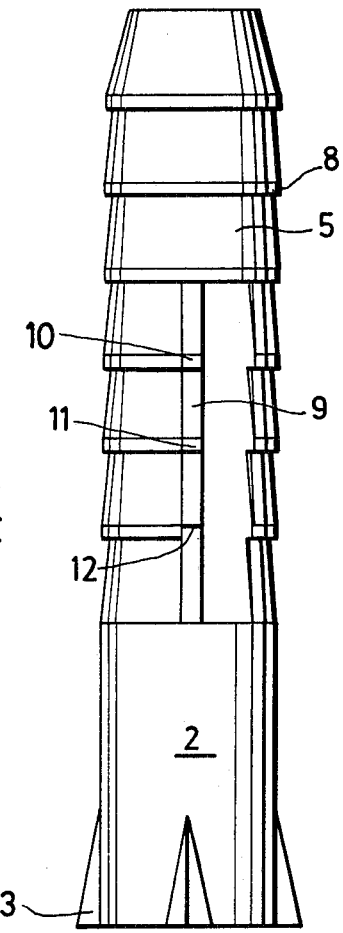
FIG.1  FIG.3
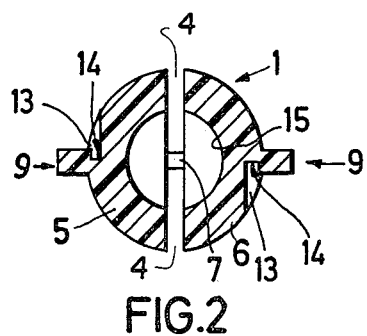
FIG.2

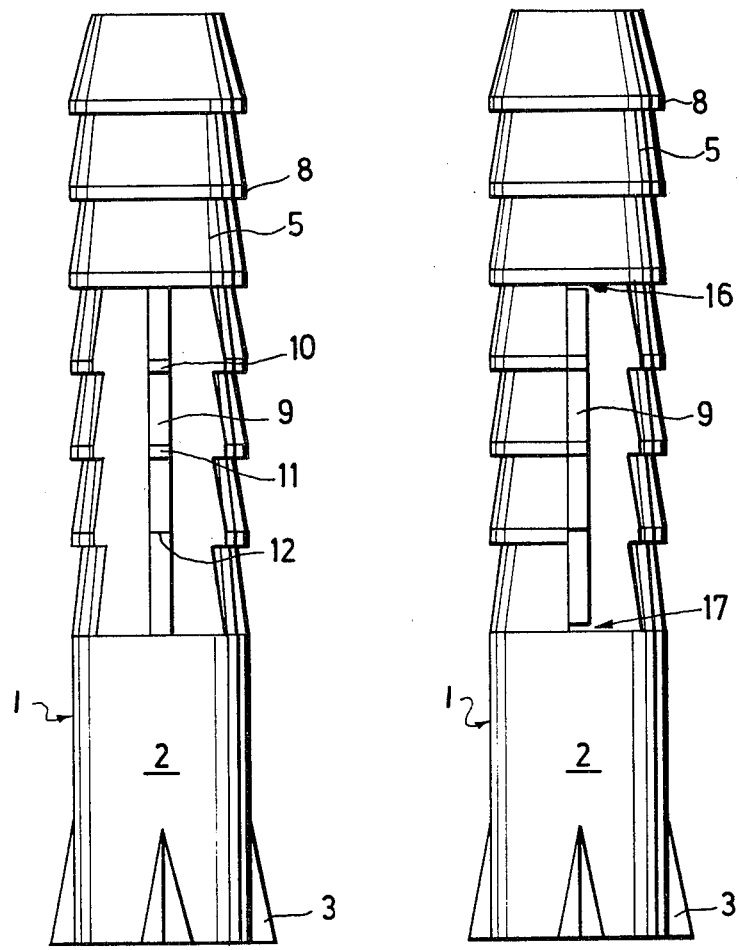
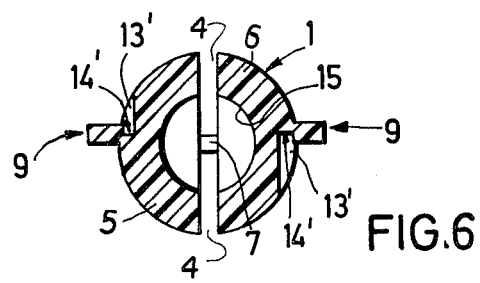

EXPANSION PLUG FOR SECURING FASTENING ELEMENTS

This is a continuation, of application Ser. No. 657,223, filed Feb. 11, 1976, now abandoned.

FIELD AND BACKGROUND OF THE INVENTION

This invention relates in general to the construction of devices for securing parts into a wall structure and, in particular, to a new and useful expansion dowel or plug having a solid cylindrical rear portion and a split end portion with outwardly extending intermediate thickening strips extending substantially radially outwardly from the surface of each side and which are provided with undercuts or recesses at their bases at which they are joined to the plug to facilitate their pivotal movement during insertion.

DESCRIPTION OF THE PRIOR ART

The plugs or dowels which are adapted to be inserted into openings or bores into walls and similar structures in order to receive securing or fastening elements, such as screws or bolts, or which have exterior surfaces with sawtooth projections thereon for engaging securely into the wall structure are known. Slotting such dowels or plugs along their lengths is known, as well as bridges for holding the separated parts so that they do not break away. Dowels are also known which serve primarily for securing nails and are referred to in some instances as "electricians' dowels". Such nails may also include fastening elements which have knurled surfaces or transverse fins to permit them to be secured to the associated dowel or plug. Such a dowel would have a rear flange at its neck or another type dowel may include a bushing assembly which is used primarily for screws. It is also known to permit the longitudinal slots in the dowel shell at the insertion end of the dowel to open apart from a connection of the dowel parts formed by the longitudinal slots therein. Such devices also include an exterior surface with sawtooth projections and may have ends which taper conically toward the insertion end. Expansion dowels of this type are also known which are characterized in that the cavity of the unexpanded dowel extends over its entire length, starting from the neck, and it is circularly cylindrical over about ⅔ of its length and then tapers conically up to a tear-up cross-web provided at the insertion end. With such a construction, at least two longitudinal slots extend up to the dowel neck. The thickening strips carrying the sawtooth-shape elevations which protrude radially to the outside are arranged on the shell section adjoining the neck which is integral with the shell. These dowels are secured by their thickening strips against rotation better than was possible in respect to the cutout expansions of the dowels according to other known devices. In the range of action of these thickening strips, the bore holes may have greater tolerances in the sense of a greater width than was admissible with the use of the presently known dowels. Since there are no slots in the shells of these dowels under or next to the thickening strips, the thickening strips act fully as material accumulations so that a great radial pressure is achieved at the point where a screw is fastened. The material of these dowels is so elastic that their outer thickening strips can be pressed forward when the dowel is inserted into a hole corresponding to the circular cylinder circumscribing the other dowel sections. The elastic force contributes then to the anchoring of the thickening strips in the hole wall, and in the constriction of the dowel cavity caused by the impression of the thickening strip enhances the formation of the outwardly directed radial pressure when the screw enters this constriction. This form of a continuous cavity contributes to the straight guidance of the screw, since it would otherwise take place in a closed tubule with a circular cross-section.

There are limits to the amount of material which may be displaced in expansion dowels and particularly to the height of the thickening strips which may be employed since there is no room for the additional material to be displaced in a well-fitting dowel hole. In addition, there is no room for a screw to be screwed into the dowel cavity if the thickening strips are pressed in too firmly. In order to avoid this, the thickening strips can be made lower and thus with less material. However, this may have the result that the clamping effect of the dowel would be reduced.

SUMMARY OF THE INVENTION

In accordance with the present invention, there is provided an expansion dowel or insertion sleeve which may be used as a bushing assembly for wood screws and in which the screw is well-guided and may be rotated easily. The dowel is secured better against rotation and is rapidly retained by radial pressure in the bore hole against extraction forces acting in its axial direction as soon as the screw is screwed in. In accordance with the invention, the front end or insertion end of the expandable plug is provided with a plurality of longitudinally spaced sawtooth projections which may be formed as circular ridges extending inwardly from a forward inwardly tapered end. At least one thickening strip extends radially outwardly from at least one or two sides of the expandable plug and also is provided with a plurality of axially spaced sawtooth projections to facilitate the gripping thereof into the wall structure. In accordance with a feature of the invention, recesses or undercuts are formed in the exterior surface of the sleeve at the base or juncture of the thickening strips to the expandable plug. This permits their displacement or pivotal movement during the clamping of the dowel, but without hindering the easy securement of the hole structure in the receiving opening.

Due to the fact that the dowel shell is provided with recesses located to one side of the thickening strips and extending along the length thereof, additional room is provided for receiving the outside thickening material in the dowel shell. The thickening strips can be higher and have more material than is possible in the present dowels. The construction is such that the thickening strips will not be pressed radially inwardly as is the case with the known securement expandable plug constructions. The construction permits an inward folding in a lateral direction of the thickening strips and this means that the dowel cavity does not become constricted unnecessarily so that the fastening of a screw therein would be facilitated. Due to the radial pressure which is produced by the screwing in of the screw into the interior of the thickening sleeve, the thickening strips are again pressed to the outside and secure the dowel against rotation in the bore hole in the manner of a barb, and they rise partly from their folded position. In order to ensure that the material of the dowel shell which is to be displaced may be as large as possible, it is advisable to provide only one recess next to each thickening strip.

In a further development of the invention, thickening strips are separated at the front end from the dowel shell regions adjoining in the longitudinal direction of the dowel by cuts extending transversely to the longitudinal direction of the dowel up to the recess or recesses. The folding of the thickening strips is thus facilitated.

In embodiments where the longitudinal slots of the dowel shell comprise two diametrically opposed slots, the thickening strips are preferably arranged staggered about their width from the center of the dowel shell halves formed by the slots in order to increase their folding capacity.

Accordingly, it is an object of the invention to provide an improved dowel or securement plug construction for anchoring fastening devices to a wall structure, which comprises a plug member having a solid rear portion and a front portion which is slotted to permit the resilient expansion and retraction of the parts and which includes at least one radially extending thickening strip defined outwardly from the plug intermediate its length and provided with a plurality of gripping projections and wherein the exterior surface of the plug at the juncture of the thickening strips thereto is provided with a recess along the length of the thickening strips to provide a place for the pivotal displacement of the strips during insertion of the plug and the fastening element.

A further object of the invention is to provide a securement plug or dowel which is simple in design, rugged in construction, and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawings and descriptive matter in which there are illustrated preferred embodiments of the invention.

BRIEF DESCRIPTION OF THE DRAWINGS

In the Drawings:

FIG. 1 is a side elevational view of a securement plug constructed in accordance with the invention;

FIG. 2 is a section taken along the line I—I of FIG. 1;

FIG. 3 is a front elevation of the dowel shown in FIG. 1;

FIG. 4 is a view similar to FIG. 1 of another embodiment of the invention;

FIG. 5 is a view similar to FIG. 1 of still another embodiment of the invention; and FIG. 6 is a sectional view similar to FIG. 2 of another embodiment of the invention.

DESCRIPTION OF THE PREFERRED EMBODIMENTS

Referring to the drawings in particular, the invention embodied therein, a securement plug or dowel, generally designated 1, which includes a substantially closed neck portion 2 and an opposite front end or insertion end with an inwardly tapered front end part 20. A plurality of circumferentially spaced and radially extending wedgeshape fins 3 are formed at the rear end 2. At least one, and preferably two, longitudinally extending slots 4 extend inwardly from the front end to the closed portion 2. The slots 4, 4 divide the securement plug into two half portions 5 and 6 extending inwardly from the insertion end to the closed end 2. These two half portions are interconnected by means of a thin web or bridge 7. This bridge can be easily torn open. A cavity or bore 15 traverses the interior of the dowel in an axial direction and it is circularly cylindrical at least in the range of the dowel solid portion 2 which extends over about ⅓ of the length of the dowel total length. The bore 15 may then taper inwardly to the insertion end up to the location of the web or bridge 7.

The exterior of the dowel adjacent the insertion end is provided with a plurality of longitudinally spaced sawtooth projections which are formed by continuous series of forwardly tapered annular portions.

In accordance with a feature of the invention, thickening strips 9 are provided on the exterior surface of the expandable plug 1, and in the embodiment shown, these comprise two diametrically opposite thickening strips 9, 9 having projections or gripping surfaces 10, 11 and 12, which are similar to the gripping surfaces or projections 8. Teeth 8 are arranged inside a tangent circumscribable circular cylinder. The thickening strips 9 extend over the circular cylinder radially to the outside.

In the embodiments according to FIGS. 1, 2, 3 and 5, a dowel shell recess 13 is defined in the exterior surface of expandable plug 1 alongside the juncture of each thickening strip 9 to the exterior surface of the expandable plug. In addition, this recess 13 has an undercut portion 14 of a size such that the integrality of the thickening strips is not materially reduced.

In the embodiment according to FIG. 4, the shell recesses 13' are provided next to each thickening strip 9. In the embodiment according to FIG. 5, the thickening strips 9 are separated by cuts 16 and 17 which extend at the front transverse to the longitudinal direction of the dowel up to the recess 13 from the adjoining dowel section regions in the longitudinal direction of the dowel so that the folding capacity of the thickening strips are increased.

In the embodiment according to FIG. 6, the longitudinal slots in the dowel shell are two diametrically opposed slots 13', 13', and the thickening strips are arranged staggered by their widths from the center of the dowel shell halves formed by the slots 7, 7.

If a securing plug or dowel 1, constructed in accordance with the invention, is inserted into a fitting hole provided in a wall whose diameter corresponds approximately to the circumscribable circular cylinder, its thickening strips 9 are pressed inwardly when the dowel is inserted. The slots 4 are then slightly compressed at the point of impression, so that the interior 15 of the dowel is slightly constricted at this point. Its thickening strips 9 are tipped in the direction of the adjoining recesses 13. When a screw is secured into the dowel sleeve 1, it produces a pressure acting radially to the outside by which the thickening strips are raised partly from their tipped position. This causes thickening strips 9 to be pressed so that their teeth 10, 11 and 12 engage into the wall surface and, depending on the quality of the material, secure the dowel against rotation in the bore wall.

While specific embodiments of the invention have been shown and described in detail to illustrate the application of the principles of the invention, it will be understood that the invention may be embodied otherwise without departing from such principles.

What is claimed is:

1. An elongated expandable plug having an insertion end, into which a screw is turned in a first direction, and a closed neck opposite the insertion end; a hollow internal cavity along the expandable plug longitudinal axis which is cylindrical within the closed neck and conical towards the insertion end; a longitudinal slot extending from the insertion end to the closed neck; a plurality of projections on the outer surface of the expandable plug located between the insertion end and the closed neck which annularly surround the longitudinal axis of the expandable plug; and at least one longitudinal thickening strip of uniform breadth having a sawtooth section and which extends radially from the expandable plug farther than the plurality of projections, and wherein the at least one longitudinal thickening strip having ends extends from the closed neck of the expandable plug toward the insertion end such that the at least one thickening strip crosses some of the plurality of projections, further wherein, a longitudinal recess is provided in the outer surface of the expandable plug along the length of the at least one thickening strip where the at least one thickening strip is integral with the expandable plug, wherein the longitudinal recess is provided in front of the at least one thickening strip as viewed in the first direction, and wherein the longitudinal recess has transverse grooves which are transverse to the longitudinal recess and are positioned at the ends of the at least one thickening strip, to provide greater folding capacity to the at least one thickening strip.

2. An expandable plug as defined in claim 1, wherein the longitudinal recess extends under the thickening strip.

3. An expandable plug as defined in claim 1, wherein the recess is extended by grooves which separate the longitudinal thickening strip from the surface of the expandable plug at the ends of the longitudinal thickening strips.

4. An expandable plug as defined in claim 1, wherein the at least one thickening strip comprises two thickening strips, further wherein each of the two thickening strips is provided with a longitudinal recess such that the two longitudinal recesses are diametrically opposed and further wherein the two thickening strips and two longitudinal recesses are dimensioned such that the two thickening strips are shiftable from an at-rest position by a distance equal to the width of the thickening strips.

* * * * *